US011012455B2

(12) United States Patent
Backer et al.

(10) Patent No.: US 11,012,455 B2
(45) Date of Patent: *May 18, 2021

(54) MODIFYING A USER SESSION LIFECYCLE IN A CLOUD BROKER ENVIRONMENT

(71) Applicant: INTERNATIONAL BUSINESS MACHINES CORPORATION, Armonk, NY (US)

(72) Inventors: Shahnawaz Backer, Singapore (SG); Christopher J. Hockings, Burleigh Waters (AU); Codur S. Pranam, Singapore (SG); Rohit U. Satyanarayana, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/373,970

(22) Filed: Apr. 3, 2019

(65) Prior Publication Data

US 2019/0230111 A1    Jul. 25, 2019

Related U.S. Application Data

(63) Continuation of application No. 15/161,941, filed on May 23, 2016, now Pat. No. 10,291,636.

(51) Int. Cl.
*H04L 29/06* (2006.01)
*H04L 29/08* (2006.01)

(52) U.S. Cl.
CPC ...... *H04L 63/1425* (2013.01); *H04L 63/0892* (2013.01); *H04L 63/108* (2013.01); *H04L 63/20* (2013.01); *H04L 67/143* (2013.01); *H04L 67/22* (2013.01)

(58) Field of Classification Search
USPC .............................................................. 726/1
See application file for complete search history.

(56) References Cited

U.S. PATENT DOCUMENTS 8,832,857 B2    9/2014  Court
9,680,938 B1 *  6/2017  Gil ........................ H04L 67/22
(Continued)

FOREIGN PATENT DOCUMENTS

WO    2014046857 A1    3/2014
WO    2015070260 A1    5/2015

OTHER PUBLICATIONS

IBM: List of IBM Patents or Patent Applications Treated As Related (Appendix P), Oct. 17, 2019, pp. 1-2.
(Continued)

*Primary Examiner* — Eleni A Shiferaw
*Assistant Examiner* — Sakinah White Taylor
(74) *Attorney, Agent, or Firm* — Michael O'Keefe (57) ABSTRACT

A method for modifying a user session lifecycle is provided. The method may include verifying a user session on a cloud service provider is valid. The method may also include monitoring a plurality of user behaviors exhibited during the verified user session. The method may further include determining a plurality of session data within an identity provider should be updated based on the monitored plurality of user behaviors and a policy within a database. The method may also include modifying the determined plurality of session data.

12 Claims, 7 Drawing Sheets

(56) References Cited

U.S. PATENT DOCUMENTS

| | | | |
|---|---|---|---|
| 2003/0088677 A1* | 5/2003 | Yamamoto | H04L 67/36 709/227 |
| 2005/0044197 A1 | 2/2005 | Lai | |
| 2009/0249439 A1 | 10/2009 | Olden | |
| 2012/0011567 A1* | 1/2012 | Cronk | H04L 63/102 726/4 |
| 2014/0068094 A1* | 3/2014 | Burch | H04L 67/14 709/229 |
| 2014/0298405 A1* | 10/2014 | Qureshi | G06F 9/5005 726/1 |
| 2015/0007274 A1* | 1/2015 | Chang | G06F 21/62 726/4 |
| 2015/0095975 A1 | 4/2015 | Barton | |
| 2015/0188927 A1* | 7/2015 | Santhi | H04L 67/1002 726/4 |
| 2015/0200924 A1 | 7/2015 | Parla | |
| 2015/0215186 A1* | 7/2015 | Alonso Franco | H04L 63/102 709/224 |
| 2015/0215315 A1 | 7/2015 | Gordon | |
| 2015/0310195 A1 | 10/2015 | Bailor | |
| 2015/0372976 A1 | 12/2015 | Lonas | |
| 2016/0359861 A1* | 12/2016 | Manov | H04L 63/102 |
| 2017/0109509 A1* | 4/2017 | Baghdasaryan | G06Q 20/40 |
| 2017/0126640 A1* | 5/2017 | Vincent | H04L 63/10 |
| 2017/0147796 A1* | 5/2017 | Sardesai | G06F 21/10 |
| 2017/0149767 A1* | 5/2017 | Hinton | H04L 63/10 |
| 2017/0250812 A1* | 8/2017 | Schefenacker | H04L 9/30 |
| 2017/0289134 A1 | 10/2017 | Bradley | |
| 2017/0339176 A1 | 11/2017 | Backer | |
| 2018/0027006 A1 | 1/2018 | Zimmermann | |

OTHER PUBLICATIONS

Bradley, John Thomas, Methods and Apparatus for Single Sign on (SSO) Using a Distributed Consensus Database, Mar. 30, 2016, pp. 1-30 (Year: 2016).

Lane et al., "Understanding and Selecting Identity and Access Management for Cloud Services," Securosis Reports, Jun. 14, 2013, p. 1-31, Version 1.0, Securosis, L.L.C.

Mell et al., "The NIST Definition of Cloud Computing," National Institute of Standards and Technology, Sep. 2011, p. 1-3, Special Publication 800-145.

Newman et al., "Executive's Guide to Cloud Access Security Brokers," Bitglass Cloud Resources, 2015, p. 1-8, QuinStreet, Inc.

Oragle, "Oracle Access Management: Complete, Integrated, Scalable Access Management Solution," Oracle White Paper, May 2015, p. 1-26, Oracle Corporation.

Teger, "Synchronizing OpenSSO SAMLv2 Sessions Doesn't Make Me Anxious Anymore," Oracle Blogs, Jul. 1, 2009, p. 1-3, https://blogs.oracle.com/docteger/entry/synchronizing_opensso_samlv2_sessions, Accessed on May 3, 2016.

Uber et al., "IDP idle timeout management using session refresh via isPassive," WG—eGovernment—Working Drafts, Last Modified on Feb 8, 2012, p. 1, Kantara Initiative, http://kantarainitiative.org/confluence/display/eGov/IDP+idle+timeout+management+using+session+refresh+via+isPassive, Accessed on May 3, 2016.

* cited by examiner

MODIFYING A USER SESSION LIFECYCLE IN A CLOUD BROKER ENVIRONMENT

BACKGROUND

The present invention relates, generally, to the field of computing, and more particularly to information security.

In information technology, information security is vital to the structure of a network. Information security may relate to the process of protecting information from unauthorized users or entities. To assist in providing information security, cloud access security brokers may be utilized as cloud-based security policy enforcement tools that consolidate various types of security policy enforcement, such as authentication, single sign-on, and credential mapping.

SUMMARY

According to one embodiment, a method for modifying a user session lifecycle is provided. The method may include verifying a user session on a cloud service provider is valid. The method may also include monitoring a plurality of user behaviors exhibited during the verified user session. The method may further include determining a plurality of session data within an identity provider should be updated based on the monitored plurality of user behaviors and a policy within a database. The method may also include updating the determined plurality of session data.

According to another embodiment, a computer system for modifying a user session lifecycle is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include verifying a user session on a cloud service provider is valid. The method may also include monitoring a plurality of user behaviors exhibited during the verified user session. The method may further include determining a plurality of session data within an identity provider should be updated based on the monitored plurality of user behaviors and a policy within a database. The method may also include updating the determined plurality of session data.

According to yet another embodiment, a computer program product for modifying a user session lifecycle is provided. The computer program product may include one or more computer-readable storage devices and program instructions stored on at least one of the one or more tangible storage devices, the program instructions executable by a processor. The computer program product may include program instructions to verify a user session on a cloud service provider is valid. The computer program product may also include program instructions to monitor a plurality of user behaviors exhibited during the verified user session. The computer program product may further include program instructions to determine a plurality of session data within an identity provider should be updated based on the monitored plurality of user behaviors and a policy within a database. The computer program product may also include program instructions to update the determined plurality of session data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to information security. The following described exemplary embodiments provide a system, method, and program product to, among other things, monitor a user session on a cloud-based service provider and update a session timeout policy based on user interactions during the user session. Therefore, the present embodiment has the capacity to improve the technical field of information security by eliminating the need for a third party to implement protocol extensions, resolving user experience issues during single sign-on in a cloud access security broker environment where different inactivity time outs are implemented, and inputting user behavioral risk based on session operations executed across different service providers. Furthermore, the present embodiment may provide the ability to drive a systemwide sign-out without a user instigating a client driven operation and prevent malicious attacks from session takeover attempts at service providers.

As previously described, information security is vital to the structure of a network. Information security may relate to the process of protecting information from unauthorized users or entities. To assist in providing information security, cloud access security brokers (CASBs) may be utilized as cloud-based security policy enforcement tools that consolidate various types of security policy enforcement, such as authentication, single sign-on, and credential mapping.

CASBs may be installed between cloud service consumers and cloud service providers. During implementation, CASBs may enforce security policies, such as authentication, single sign-on, authorization, and device profiling. Additionally, CASBs may interact with an identity provider in a cloud access environment to provide single sign-on functionality and allow for authentication of the end user when accessing a cloud environment. Once a user authenticates to the identity provider, the user may access a number of service providers without again requiring user authentication upon accessing each individual service provider. In typical single sign-on systems as long as the identity provider session is available, the single sign-on capability is active. A policy associated with the identity provider or the service provider may dictate user access session limits, such as an inactivity limit or session lifetime.

However, various policies may exist in an identity provider or service provider that dictate different session timeouts or user inactivity timeouts. For example, a user may access multiple service providers after authenticating at the identity provider. The session timeout and inactivity timeout within the service provider policy may be greater than the corresponding timeouts within the identity provider. Therefore, the user may be actively utilizing the services of the service provider when the identity provider triggers a user inactivity timeout under the identity provider policy. When the user attempts to access a second service provider, the inactivity timeout of the identity provider policy requires the user to re-authenticate with the identity provider before accessing the second service provider, rather than simply allowing the user to access the second service provider, thereby creating an inconsistent user experience during single sign-on.

Additionally, each service provider may have a different associated level of trustworthiness. Threat intelligence data already classifies service providers based on the risk each provider presents. Therefore, although single sign-on may be an ultimate goal of a CASB, the threat behavior at the service provider site should be considered a part of the decision to provide ongoing single sign-on capabilities by an identity provider. As such, it may be advantageous, among other things, to implement a system that monitors interactions with various service providers and identity providers to adjust access policies accordingly to allow for consistent, ongoing single sign-on capabilities.

According to one embodiment, a context-based access policy may be utilized that modifies user sessions on a cloud service provider and/or an identity provider to achieve seamless single sign-on access across different service providers in a cloud broker environment. In at least one embodiment, identity provider session data may be made available for modification and update. Service provider activity may be continuously monitored via application programming interface-based log collection operations. Furthermore, real time threat alerts may be integrated as input to user session operations. When dictated by user behavior or risk observations on the service provider level, the identity provider session data may be modified accordingly to either extend or retract user access to a cloud service.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product that updates a cloud access policy based on user interactions and the risk level associated with service providers. More specifically, an access policy may be updated to extend, retract, or terminate session timeout limits to allow for a more seamless user experience on a single sign-on platform.

Figure 1:
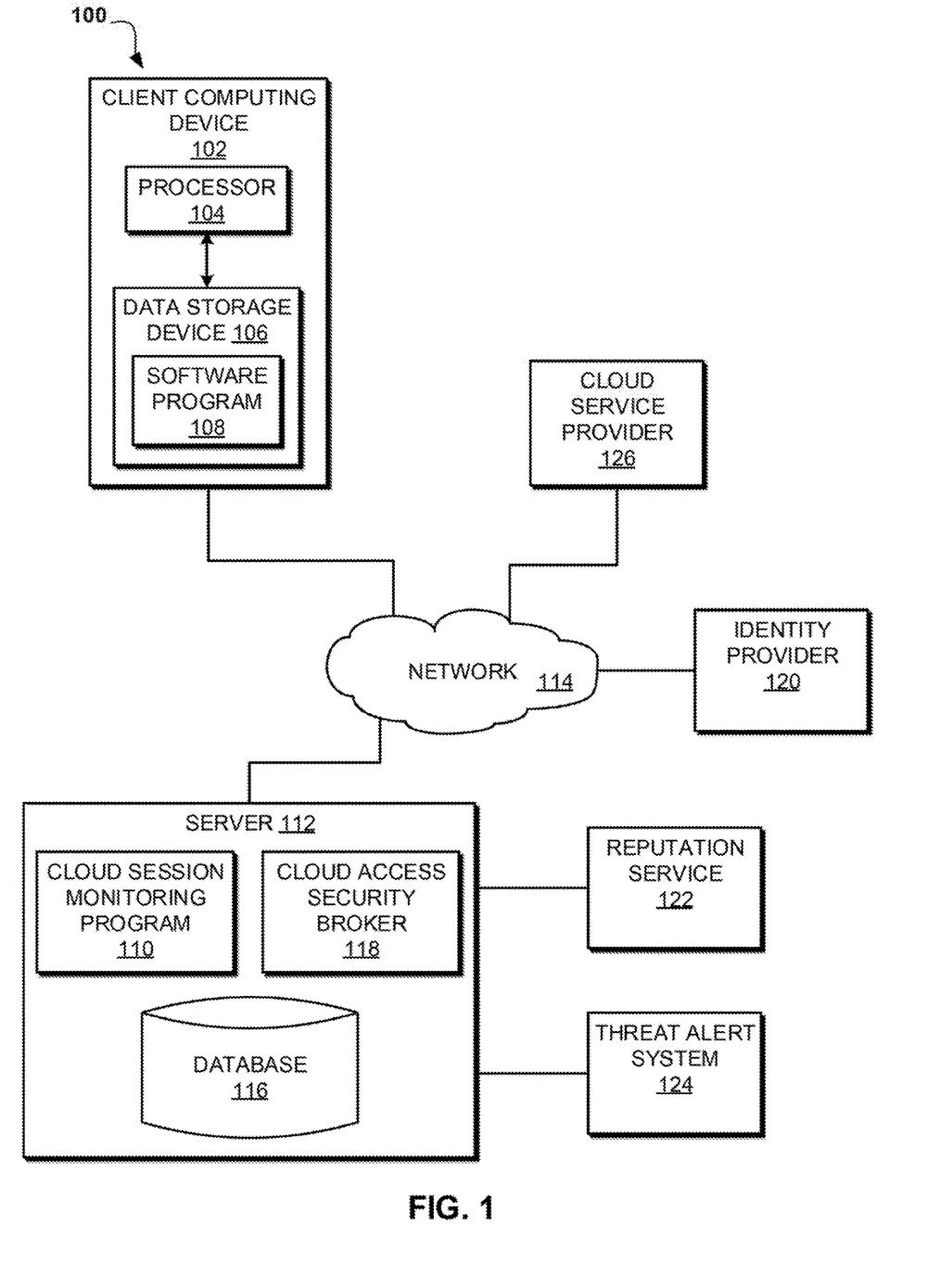
FIG. 1 illustrates an exemplary networked computer environment according to at least one embodiment.

Referring to FIG. 1, an exemplary networked computer environment 100 is depicted, according to at least one embodiment. The networked computer environment 100 may include a client computing device 102, a server 112, an identity provider 120, and a cloud service provider 126 interconnected via a communication network 114. According to at least one implementation, the networked computer environment 100 may include a plurality of client computing devices 102 and a plurality of servers 112, only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 102 may include a processor 104 and a data storage device 106 that is enabled to host and run a software program 108 and communicate with the server 112 via the communication network 114, in accordance with one embodiment of the invention. The client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a cloud session monitoring program 110, a database 116, and a cloud access security broker (CASB) 118 and communicating with the client computing device 102, the identity provider 120, and the cloud service provider 126 via the communication network 114, in accordance with embodiments of the invention. Furthermore, the server 112 may be communicatively connected to the reputation service 122 and the threat alert system 124. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the cloud session monitoring program 110 may be a program capable of monitoring behaviors and risks within a service provider through application programming interfaces based on user interactions. The cloud session monitoring program 110 may retrieve user behaviors from a cloud service provider 126, determine the reputation of the cloud service provider 126 based on the user behaviors, and register for a range of threat alerts on hosts connected as cloud service providers 126. Upon determining a policy should be updated based on monitoring the behaviors and risks associated with a cloud service provider 126, the cloud session monitoring program 110 may also be capable of notifying the identity provider 120 to update a session timeout. Additionally, the cloud session monitoring program 110 may receive and process information from the database 116, the CASB 118, the reputation service 122, and the threat alert system 124 to make a determination on whether to allow user access to a cloud service provider 126. If a policy is triggered, the cloud session monitoring program 110 may evaluate and update the user session data within the identity provider 120 to modify session timeouts (e.g. extend the session timeout) or terminate the current user session. The cloud session monitoring method is explained in further detail below with respect to FIG. 2.

The cloud service provider 126 may be a cloud application that may be remotely accessed from a mobile device by a user. During execution, the cloud service provider 126 may utilize numerous application programming interfaces that may interact with other programs, such as the cloud session monitoring program 110, the database 116, the CASB 118, the identity provider 120, the reputation service 122, and the threat alert system 124.

The database 116 may be a policy database capable of storing policies that consume captured information. The information stored within database 116 may be utilized by the cloud session monitoring program 110 to make user access decisions, such as whether to authenticate a user for access to a cloud service. Based on the policy stored within the database 116, a user session may be extended or terminated by the identity provider 120. For example, if a policy within database 116 is written to terminate a user session when a cloud service provider 126 being accessed by the user has become a known host for malware, the cloud session monitoring program 110 may terminate all sessions to prevent infection of the user's entire current session.

The CASB 118 may be a multi-tenantable, on-premises or cloud-based brokering program capable of connecting to a cloud service provider 126. When a user attempts to access a cloud service provider 126, the request may be routed through the CASB 118. The CASB 118 may broker the request through the identity provider 120 to verify the user device and credentials, which may be stored within the CASB 118 or a data repository, such as database 116, capable of access by the CASB 118. Once verification of the user's device and identity is complete, the CASB 118 may complete the data flow between the user device and the cloud service provider 126 and create a session within the identity provider 120 and the cloud service provider 126. Furthermore, the CASB 118 may monitor users accessing a cloud service through application program interfaces.

The identity provider 120 may be a program capable of authenticating a user's identity when the user accesses a cloud service, such as cloud service provider 126. The identity provider 120 may receive a request from the CASB 118 when a user attempts to access a network. Upon receiving an access request, the identity provider 120 may request authentication from the user. Once the CASB 118 verifies the user's identity and device, a user session may be created within the identity provider 120. Furthermore, the identity provider 120 may be capable of terminating user access to a cloud service based on a policy within database 116, such as a preconfigured user session timeout.

The reputation service 122 and the threat alert system 124 may be known technologies delivered by various third party vendors in a cloud-based environment. The threat alert system 124 may be a program capable of identifying malicious content, such as malware-infected devices or users performing unusual transactions. The reputation service 122 may be a program capable of evaluating a service provider's risk. A security breach in the service provider infrastructure may relate to an increased risk of a malicious attack. Similarly, changes to, or a history of data loss from, the cloud service provider 126 may relate to a very high risk by allowing access to a cloud service provider 126. Since various service providers may have different inherent risk factors, using the reputation service 122 may calculate the risk involved by accessing a cloud service provider 126. The services provided by the reputation service 122 and the threat alert system 124 may be utilized by the CASB 118 when an assessment of a cloud service provider 126 is needed.

Figure 2:
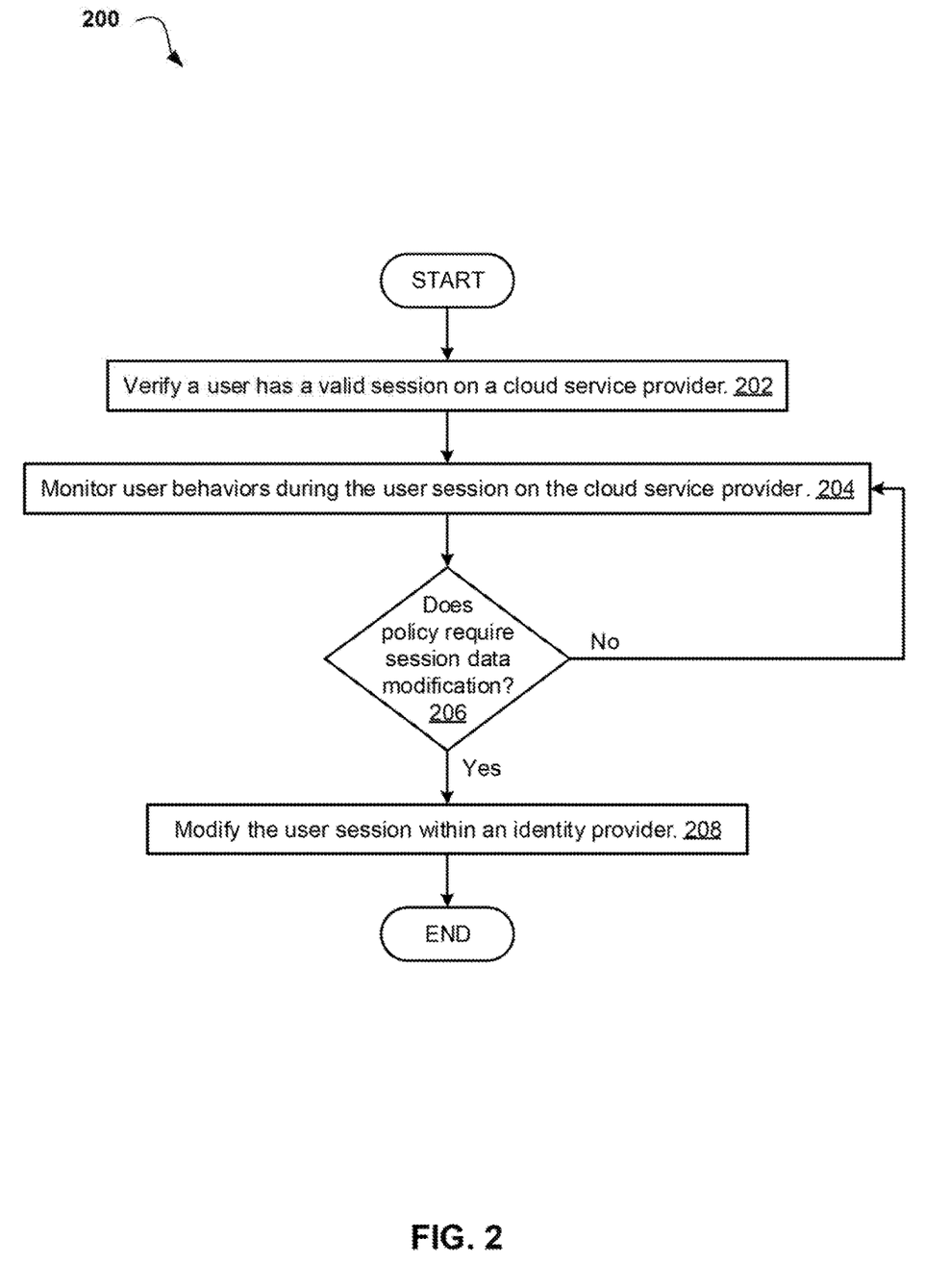
FIG. 2 is an operational flowchart illustrating a cloud session monitoring process according to at least one embodiment.

Referring now to FIG. 2, an operational flowchart illustrating a cloud session monitoring process 200 is depicted, according to at least one embodiment. At 202, the cloud session monitoring program 110 (FIG. 1) verifies a user has a valid session on a cloud service provider 126 (FIG. 1) by calling an application programming interface on the cloud service provider 126 (FIG. 1). As previously described, a user may be granted access to a cloud service provider 126 (FIG. 1) by the CASB 118 (FIG. 1) after providing verification through the identity provider 120 (FIG. 1). Upon the completion of verification, the cloud session monitoring program 110 (FIG. 1) may determine the user session on the cloud service provider 126 (FIG. 1) has begun.

Then, at 204, the cloud session monitoring program 110 (FIG. 1) monitors user behaviors during the user session on the cloud service provider 126 (FIG. 1). The cloud service provider 126 (FIG. 1) may utilize application programming interfaces that are used by the CASB 118 (FIG. 1). The application programming interfaces may allow the cloud session monitoring program 110 (FIG. 1), through the CASB 118 (FIG. 1), to monitor the user accessing the cloud service and the user behaviors exhibited while the user is interacting with the cloud service. For example, the cloud session monitoring program 110 (FIG. 1) may utilize the application programming interfaces to collect personally identifiable information (e.g. user device IP address) for compliance purposes. As an additional example, the cloud session monitoring program 110 (FIG. 1) may utilize the application programming interfaces to determine if the user is performing an approved activity (e.g. using a preconfigured graphical user interface) or a high risk activity (e.g. injecting source code) that may expose the device to a security threat through the user's interactions. Additionally, the user behaviors collected by the application programming interfaces and utilized by the CASB 118 (FIG. 1) may include user data (e.g. user activity data, operational data detailing the operations performed by the user, the resource being accessed by the user, and user anomaly data) and device information (e.g. device management status and device geographic location). Furthermore, the CASB 118 (FIG. 1) may maintain logs to track user information, such as active user identities and the uniform resource locators being accessed by specific users. The behavioral data collected by the CASB 118 (FIG. 1) may aid in the construction of a user context report across multiple cloud service providers 126 (FIG. 1).

The cloud session monitoring program 110 (FIG. 1) may also utilize the reputation service 122 (FIG. 1) and the threat alert system 124 (FIG. 1) when monitoring the behavioral data. As previously described, the reputation service 122 (FIG. 1) may evaluate the risk associated with a user accessing a particular service provider. Also as previously described, the threat alert system 124 (FIG. 1) may identify malware-infected devices and users performing unusual transactions that may compromise the security of the user's device or other service providers the user accesses.

Next, at 206, the cloud session monitoring program 110 (FIG. 1) determines whether the policy within the database 116 (FIG. 1) requires the session data within the identity provider 120 (FIG. 1) to be modified based on the monitored behaviors. The session data may relate to the user inactivity timeout limit and the session timeout limit associated with a particular user session. Based on the monitored behaviors, the cloud session monitoring program 110 (FIG. 1) may modify the session data when there is a high security risk associated with a service provider or user activities. According to one implementation, the cloud session monitoring process 200 may continue along the operational flowchart, if the session data should be modified. The cloud session monitoring program 110 (FIG. 1) may utilize the behavioral data to determine whether to modify the session data. For example, the cloud session monitoring program 110 (FIG. 1) may analyze the behavioral data to determine that a service provider, such as cloud service provider 126 (FIG. 1), has a risk level for malware or third party attacks below a preconfigured threshold and, therefore, the cloud session monitoring program 110 (FIG. 1) may determine that the session data should be modified so that the user is not required to re-authenticate before accessing different service provider. If the cloud session monitoring program 110 (FIG. 1) determines the session data should be modified (step 206, "Yes" branch), the cloud session monitoring process 200 may continue to step 208 to modify the session data. If the cloud session monitoring program 110 (FIG. 1) determines the session data should not be modified (step 206, "No" branch), the cloud session monitoring process 200 may return to step 204 to further monitor behavioral data exhibited during the user session.

If the cloud session monitoring program 110 (FIG. 1) determines the session data should be modified, then, at 208, the cloud session monitoring program 110 (FIG. 1) modifies the user session data within the identity provider 120 (FIG. 1). Once the cloud session monitoring program 110 (FIG. 1) determines the session data should be modified, the cloud session monitoring program 110 (FIG. 1) may modify the session data (e.g. a user inactivity timeout policy or a user session limit timeout policy) by transmitting a notification to the identity provider 120 (FIG. 1) detailing the specific information surrounding the session data modification. For example, if the cloud session monitoring program 110 (FIG. 1) determines the session data should be modified to extend a user inactivity timeout policy from 30 minutes to 35 minutes, the five minute extension of the user inactivity timeout policy in the session data may be detailed within the notification transmitted from the cloud session monitoring program 110 (FIG. 1) to the identity provider 120 (FIG. 1). As an additional example, the cloud session monitoring program 110 (FIG. 1) may modify the session data based on a determination to extend a user session limit timeout policy from 45 minutes to one hour. The notification transmitted by the cloud session monitoring program 110 (FIG. 1) may include various modifications to the session data, such as session termination or session lifetime extension. Once the identity provider 120 (FIG. 1) receives the notification from the cloud session monitoring program 110 (FIG. 1), the identity provider 120 (FIG. 1) may modify the session data according to the details within the notification.

Figure 3:
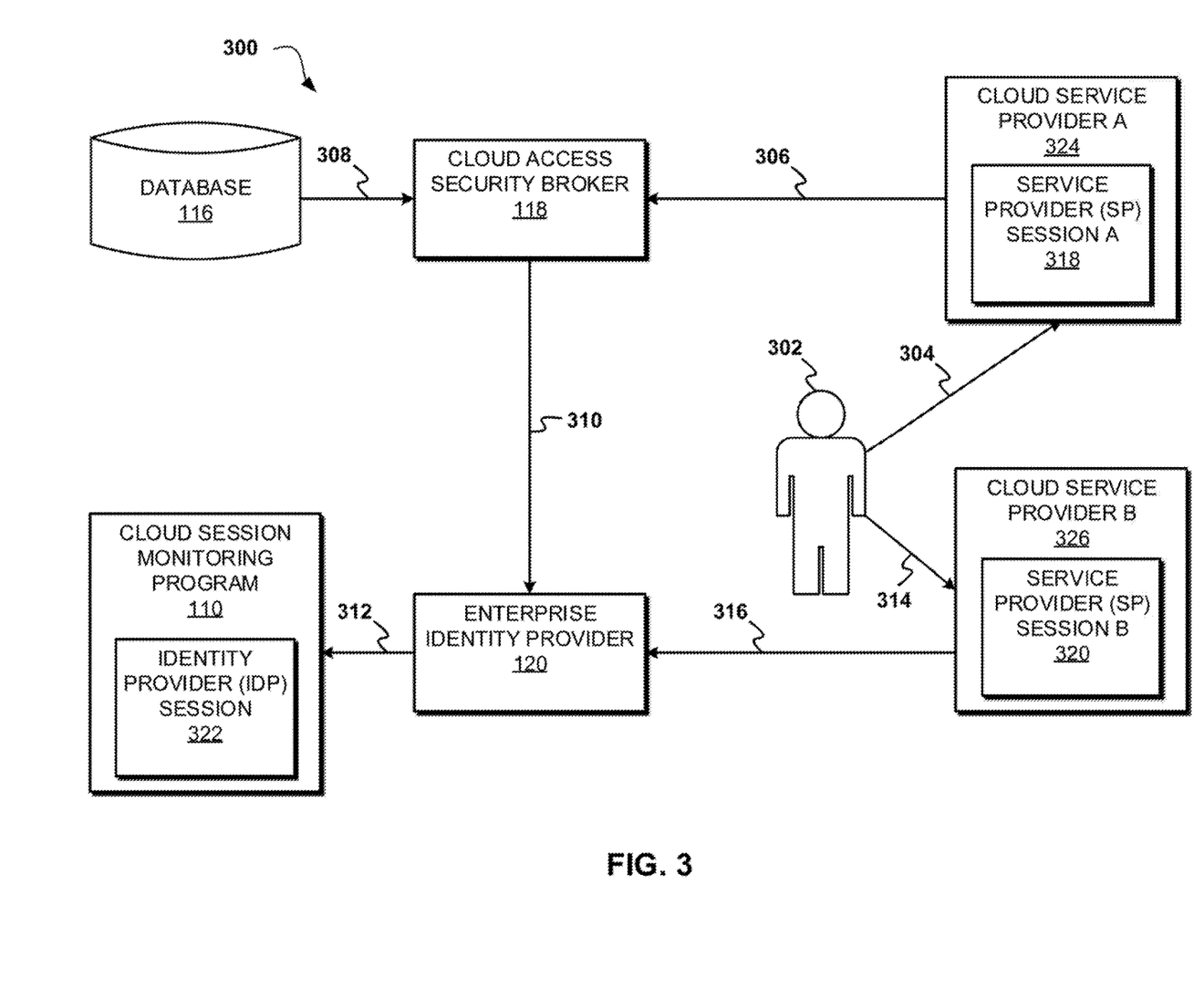
FIG. 3 is a functional block diagram of a cloud session monitoring service according to at least one embodiment.

Referring now to FIG. 3, a functional block diagram of a cloud session monitoring service 300 is depicted, according to at least one embodiment. At 304, a user 302 may access cloud service provider A 324 through interactions with a graphical user interface associated with the identity provider 120. Then, at 306, while actively using the cloud service provider A 324 through service provider (SP) session A 318, the CASB 118 may monitor behavioral data exhibited by the SP session A 318 captured by utilizing application programming interfaces. Next, at 308, the CASB 118 may analyze the captured behavioral data along with policies stored within the database 116 in order to make a determination on whether to modify the session data of the identity provider 120. Then, at 310, the decision to modify the session data is transmitted to the identity provider 120. Next, at 312, the identity provider 120 modifies the session data of the identity provider (IDP) session 322 hosted within the cloud session monitoring program 110. Then, at 314, the user 302 may initiate SP session B 320 by accessing cloud service provider B 326, through interactions with the graphical user interface on the display screen of the client computing device 102 (FIG. 1). Next, at 316, the cloud service provider B 326 may communicate with the identity provider 120 to determine whether the IDP session 322 hosted within the cloud session monitoring program 110 is valid and whether the user 302 is required to authenticate before beginning the SP session B 320. Depending on the modifications to the session timeout limit in step 312, the user 302 may not be required to re-authenticate before beginning the SP session B 320.

Figure 4:
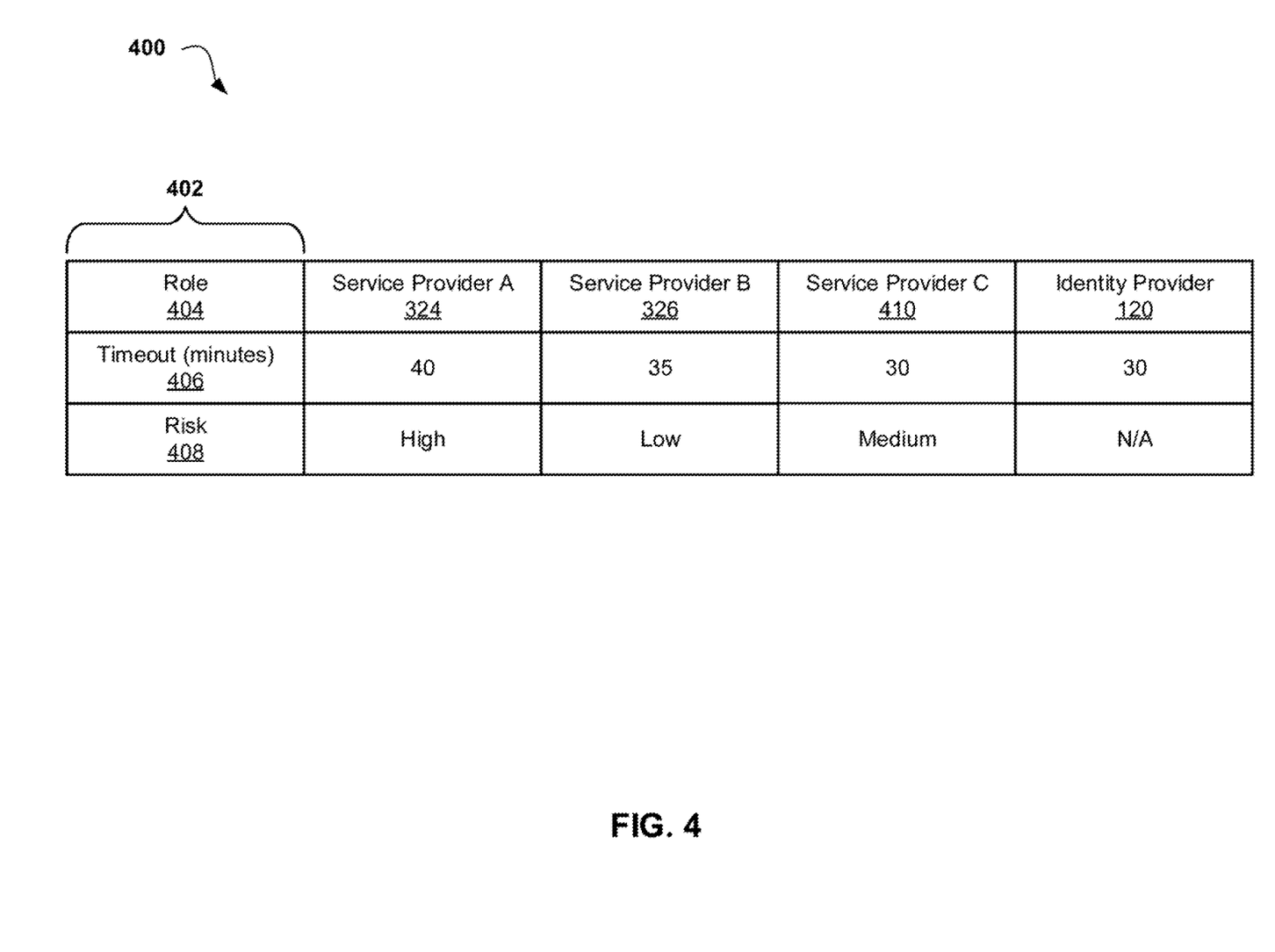
FIG. 4 is a functional block diagram of a provider timeout table according to at least one embodiment.

Referring now to FIG. 4, a functional block diagram of a provider timeout table 400 is depicted, according to at least one embodiment. The provider timeout table 400 within a policy database 116 (FIG. 1) may include a heading column 402 that depicts the classification of each row 404-408 within the table 400, such as a role row 404 depicting the provider name, a timeout row 406 depicting the configured minutes before a timeout is enabled for each provider, and a risk row 408 depicting the risk level associated with each provider. The providers depicted within the role row 404 may include service provider A 324, service provider B 326, service provider C 410, and identity provider 120. The timeout row 406 may depict the corresponding timeout minutes for the service provider A 324, the service provider B 326, the service provider C 410, and the identity provider 120. The risk row 408 may depict the corresponding risk level for the service provider A 324, the service provider B 326, the service provider C 410, and the identity provider 120. The risk level associated with each provider may be classified as low, medium, or high. The risk associated with a service provider may be identified based on reputation (e.g. recent security breach or lack of any security breach), a context rating established during the access to the service (e.g. user 302 (FIG. 3) accesses from a new geographic location or a home location), and the value of the transactions processed (e.g. sensitive data being modified on the service provider portal). The context rating may be a calculated score or written assessment generated by the cloud session monitoring program 110 (FIG. 1) using gathered user data.

According to one embodiment, a user 302 (FIG. 3) may access service provider A 324. When accessing service provider A 324, the user 302 (FIG. 3) may be required to authenticate at the identity provider 120. Since the authentication timeout for the identity provider 120 is 30 minutes, the identity provider 120 may timeout after 30 minutes has elapsed. Since service provider A 324 has a high risk level, the cloud session monitoring program 110 (FIG. 1) may not extend the session at the identity provider 120 once the 30 minute timeout limit has been reached even though the timeout limit corresponding to service provider A 324 is configured at 40 minutes. Therefore, if the user 302 (FIG. 3) subsequently accesses service provider B 326, the user 302 (FIG. 3) may be required to authenticate with the identity provider 120. Authentication with the identity provider 120 may renew the 30 minute timeout limit corresponding to the identity provider 120. However, since service provider B 326 has a low risk level, the cloud session monitoring program 110 (FIG. 1) may modify the session data to extend the session within the identity provider 120. Therefore, if the user 302 (FIG. 3) subsequently accesses service provider C 410, the user 302 (FIG. 3) may not be required to authenticate since the user session has been extended. In such a scenario, a policy may be defined that states the extended session is not applicable to service provider A 324. Therefore, each time the session at service provider A 324 expires, the user 302 (FIG. 3) may be required to re-authenticate to the identity provider 120 to continue accessing service provider A 324 or access another service provider (e.g. service provider B 326 or service provider C 410). However, re-authentication may not be required under such circumstances for user access to service provider B 326 or service provider C 410 when the timeout limit is reached.

According to another embodiment, a user 302 (FIG. 3) may access service provider B 326. When accessing service provider B 326, the user 302 (FIG. 3) may be required to authenticate at the identity provider 120. As previously described, since the authentication timeout for the identity provider 120 is 30 minutes, the identity provider may timeout after 30 minutes has elapsed. However, since service provider B 326 has a low risk level, the cloud session monitoring program 110 (FIG. 1) may extend the session at the identity provider 120 by the 30 minute timeout limit allocated to the identity provider 120 once the original 30 minute timeout limit has been reached. Therefore, if the user 302 (FIG. 3) subsequently accesses service provider C 410, the user 302 (FIG. 3) may not be required to authenticate with the identity provider 120. If the user 302 (FIG. 3) subsequently accesses service provider A 324, the user 302 (FIG. 3) may not be required to authenticate since the user session has been extended within the identity provider 120. In another embodiment, the user 302 (FIG. 3) may be required to re-authenticate or provide a strong authentication before accessing service provider A 324 since service provider A 324 has a high risk level. A strong authentication may be a known multifactor authentication technique that utilizes an intrinsically stringent method of verifying a user identity or a device identity. For example, a user may be prompted to provide a security password known only to the user and the user device may provide a security token exclusive to the user device. Furthermore, a policy within the database 116 (FIG. 1) may be defined to state various provider specific actions, such as an extended session at the identity provider 120 may be applicable to service provider A 324 after strong authentication, the session at the identity provider 120 may be terminated when the user 302 (FIG. 3) accesses service provider A 324 thereby requiring the user 302 (FIG. 3) to re-authenticate, a logout of a specified service provider (e.g. service provider A 324, service provider B 326, or service provider C 410) may trigger a logout of the identity provider 120, a provider session may not be logged out due to an inactivity or session logout event from a public federated service, or a threat alert from one service provider may trigger a logout from a provider.

It may be appreciated that FIGS. 2-4 provide only an illustration of one implementation and do not imply any limitations with regard to how different embodiments may be implemented. Many modifications to the depicted environments may be made based on design and implementation requirements.

Figure 5:
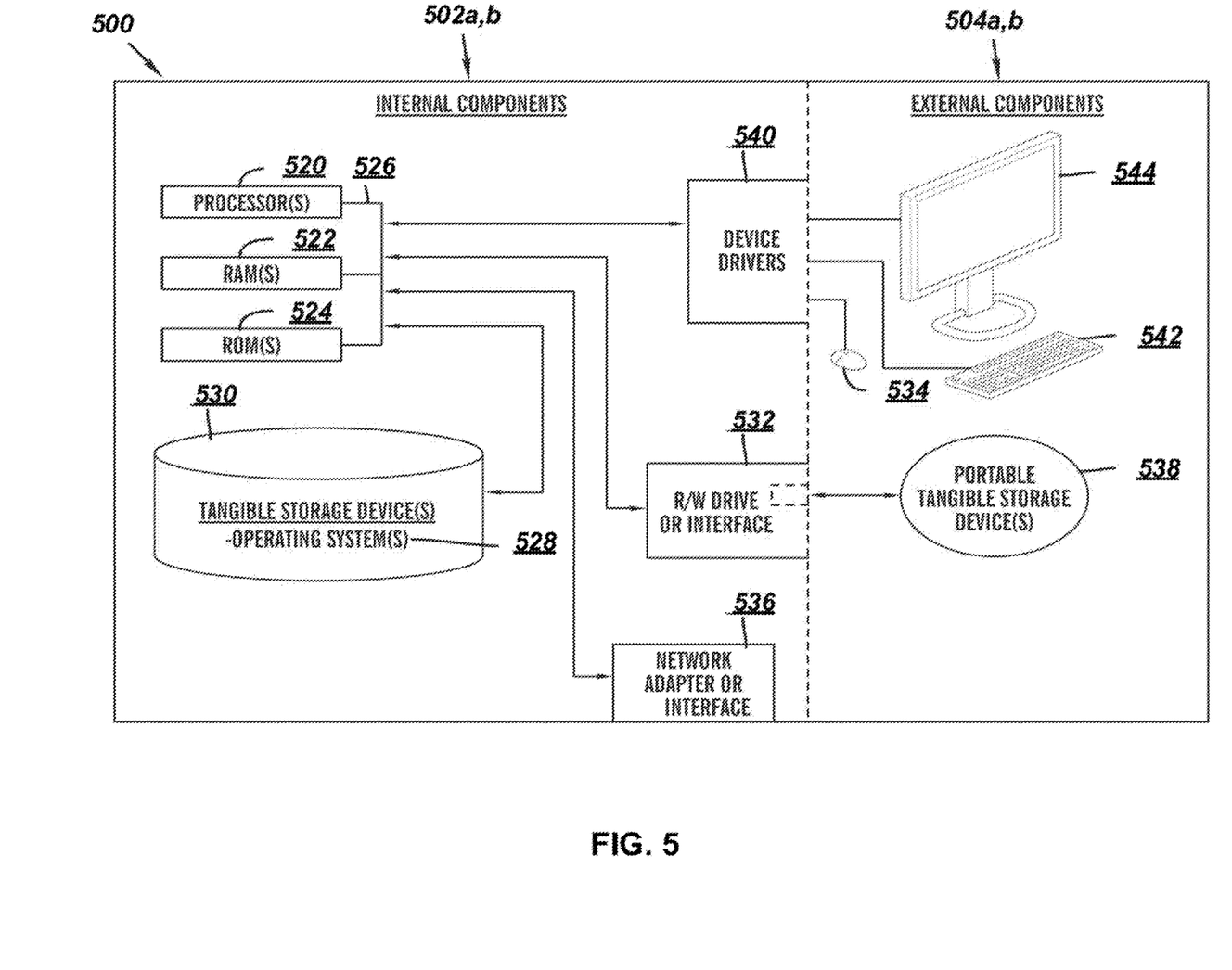
FIG. 5 is a block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 (FIG. 1) and the server 112 (FIG. 1) may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 (FIG. 1) in the client computing device 102 (FIG. 1) and the cloud session monitoring program 110 (FIG. 1) in the server 112 (FIG. 1) are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the cloud session monitoring program 110 (FIG. 1), can be stored on one or more of the respective portable computer-readable tangible storage devices 538, read via the respective R/W drive or interface 532 and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 (FIG. 1) in the client computing device 102 (FIG. 1) and the cloud session monitoring program 110 (FIG. 1) in the server 112 (FIG. 1) can be downloaded to the client computing device 102 (FIG. 1) and the server 112 (FIG. 1) from an external computer via a network (for example, the Internet, a local area network or other, wide area network) and respective network adapters or interfaces 536. From the network adapters or interfaces 536, the software program 108 (FIG. 1) in the client computing device 102 (FIG. 1) and the cloud session monitoring program 110 (FIG. 1) in the server 112 (FIG. 1) are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532 and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
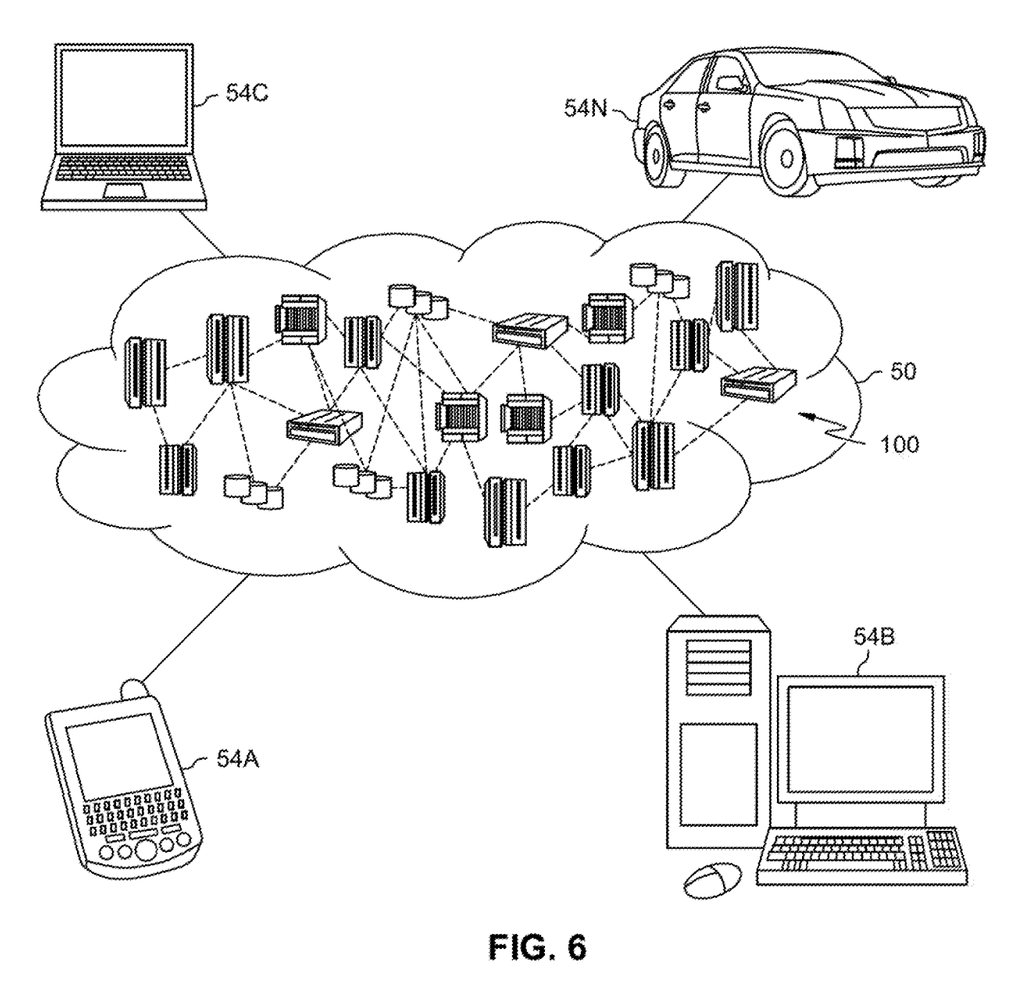
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
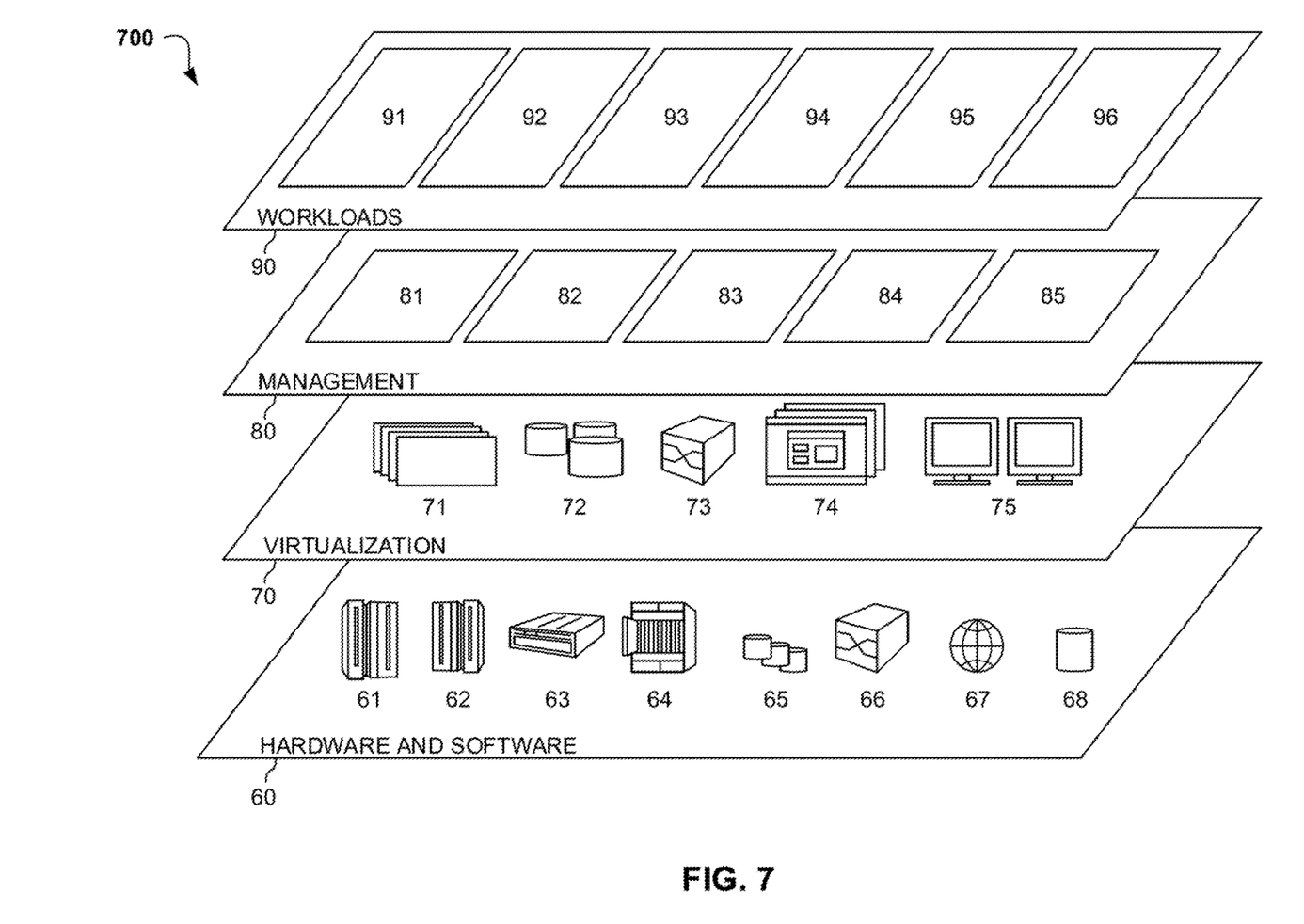
FIG. 7 depicts abstraction model layers according to an embodiment of the present invention.

Referring now to FIG. 7 a set of functional abstraction layers 700 provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cloud session monitoring 96. Cloud session monitoring 96 may relate to monitoring service provider behaviors exhibited during a user session. Based on the observed behaviors, cloud session monitoring 96 may also include updating a timeout policy associated with one or more service providers and/or identity providers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for modifying a user session lifecycle, the method comprising:

monitoring a plurality of user behaviors exhibited during the authenticated user session, wherein monitoring the plurality of user behaviors utilizes a reputation service and a threat alert system, and wherein the threat alert system identifies malware-infected devices and users performing unusual transactions capable of compromising security of a user device or other service providers accessed by a user;

determining a plurality of session data relating to a session timeout within an identity provider should be updated based on a plurality of user behaviors and a security policy within a database, wherein initiating the session timeout relates to terminating a user session based on an elapsed time since user authentication; and wherein the plurality of user behaviors comprise a device management status, and wherein the determined plurality of session data is selected from a group consisting of a user inactivity timeout policy and a user session limit timeout policy;

modifying, within the identity provider, the determined plurality of session data based on the determination, wherein modifying the determined plurality of session data further comprises:

transmitting a notification to the identity provider detailing a plurality of modification information to update the determined plurality of session data, wherein the plurality of modification information is selected from a group consisting of a session termination, a session lifetime extension, and a session re-authorization; and modifying, by the identity provider, the determined plurality of session data based the transmitted notification;

in response to the session timeout being initiated, instructing the identity provider to authenticate a new user session of the user device on a second cloud service provider under the single source sign-on service; and in response to the session timeout being extended, providing user access, by an extension of the user session, to the second cloud service provider based on the modified plurality of session data.

2. The method of claim 1, wherein the plurality of user behaviors is further selected from a group consisting of a plurality of personal identifiable information, a plurality of user activity data, a plurality of operational data detailing a plurality of operations performed by a user, a resource being accessed by the user, a plurality of user anomaly data, and a device geographic location.

3. The method of claim 1, wherein determining the plurality of session data within the identity provider should be updated further comprises:

analyzing the monitored plurality of user behaviors; and determining the cloud service provider has an associated risk level for a plurality of malware or a plurality of third party attacks below a preconfigured threshold based on the analyzed plurality of user behaviors.

4. The method of claim 1, wherein modifying the determined plurality of session data is selected from a group consisting of extending the verified user session and terminating the verified user session.

5. A computer system for modifying a user session lifecycle, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

monitoring a plurality of user behaviors exhibited during the authenticated user session, wherein monitoring the plurality of user behaviors utilizes a reputation service and a threat alert system, and wherein the threat alert system identifies malware-infected devices and users performing unusual transactions capable of compromising security of a user device or other service providers accessed by a user;

determining a plurality of session data relating to a session timeout within an identity provider should be updated based on a plurality of user behaviors and a security policy within a database, wherein initiating the session timeout relates to terminating a user session based on an elapsed time since user authentication; and wherein the plurality of user behaviors comprise a device management status, and wherein the determined plurality of session data is selected from a group consisting of a user inactivity timeout policy and a user session limit timeout policy;

modifying, within the identity provider, the determined plurality of session data based on the determination, wherein modifying the determined plurality of session data further comprises:
transmitting a notification to the identity provider detailing a plurality of modification information to update the determined plurality of session data, wherein the plurality of modification information is selected from a group consisting of a session termination, a session lifetime extension, and a session re-authorization; and
modifying, by the identity provider, the determined plurality of session data based the transmitted notifications;

in response to the session timeout being initiated, instructing the identity provider to authenticate a new user session of the user device on a second cloud service provider under the single source sign-on service; and in response to the session timeout being extended, providing user access, by an extension of the user session, to the second cloud service provider based on the modified plurality of session data.

6. The computer system of claim 5, wherein the plurality of user behaviors is further selected from a group consisting of a plurality of personal identifiable information, a plurality of user activity data, a plurality of operational data detailing a plurality of operations performed by a user, a resource being accessed by the user, a plurality of user anomaly data, and a device geographic location.

7. The computer system of claim 5, wherein determining the plurality of session data within the identity provider should be updated further comprises:
analyzing the monitored plurality of user behaviors; and
determining the cloud service provider has an associated risk level for a plurality of malware or a plurality of third party attacks below a preconfigured threshold based on the analyzed plurality of user behaviors.

8. The computer system of claim 5, wherein modifying the determined plurality of session data is selected from a group consisting of extending the verified user session and terminating the verified user session.

9. A computer program product for modifying a user session lifecycle, the computer program product comprising:
one or more computer-readable tangible storage medium and program instructions stored on at least one of the one or more tangible storage medium, the program instructions executable by a processor capable of performing a method, the method comprising:

monitoring a plurality of user behaviors exhibited during the authenticated user session, wherein monitoring the plurality of user behaviors utilizes a reputation service and a threat alert system, and wherein the threat alert system identifies malware-infected devices and users performing unusual transactions capable of compromising security of a user device or other service providers accessed by a user;

determining a plurality of session data relating to a session timeout within an identity provider should be updated based on a plurality of user behaviors and a security policy within a database, wherein initiating the session timeout relates to terminating a user session based on an elapsed time since user authentication; and wherein the plurality of user behaviors comprise a device management status, and wherein the determined plurality of session data is selected from a group consisting of a user inactivity timeout policy and a user session limit timeout policy;

modifying, within the identity provider, the determined plurality of session data based on the determination, wherein modifying the determined plurality of session data further comprises:
transmitting a notification to the identity provider detailing a plurality of modification information to update the determined plurality of session data, wherein the plurality of modification information is selected from a group consisting of a session termination, a session lifetime extension, and a session re-authorization; and
modifying, by the identity provider, the determined plurality of session data based the transmitted notifications;

in response to the session timeout being initiated, instructing the identity provider to authenticate a new user session of the user device on a second cloud service provider under the single source sign-on service; and in response to the session timeout being extended, providing user access, by an extension of the user session, to the second cloud service provider based on the modified plurality of session data.

10. The computer program product of claim 9, wherein the plurality of user behaviors is further selected from a group consisting of a plurality of personal identifiable information, a plurality of user activity data, a plurality of operational data detailing a plurality of operations performed by a user, a resource being accessed by the user, a plurality of user anomaly data, and a device geographic location.

11. The computer program product of claim 9, wherein determining the plurality of session data within the identity provider should be updated further comprises:
program instructions to analyze the monitored plurality of user behaviors; and
program instructions to determine the cloud service provider has an associated risk level for a plurality of malware or a plurality of third party attacks below a preconfigured threshold based on the analyzed plurality of user behaviors.

12. The computer program product of claim 9, wherein modifying the determined plurality of session data is selected from a group consisting of extending the verified user session and terminating the verified user session.

* * * * *